US005600756A

United States Patent [19]

Ely

[11] Patent Number: 5,600,756
[45] Date of Patent: Feb. 4, 1997

[54] METHOD OF LABELLING TAKES IN AN AUDIO EDITING SYSTEM

[75] Inventor: Reuel A. Ely, Plantation, Fla.

[73] Assignees: Sony Corporation, Japan; Sony Electronics, Inc.

[21] Appl. No.: 240,552

[22] Filed: May 11, 1994

[51] Int. Cl.⁶ ........................................ G10L 5/06
[52] U.S. Cl. ................. 395/2.44; 395/2.87; 395/2.79
[58] Field of Search ................. 395/2.44, 2.87, 395/2.85, 2.79, 162; 381/44, 119, 48

[56] References Cited

U.S. PATENT DOCUMENTS

| 4,992,892 | 2/1991 | Ely ............................ 360/27 |
| 5,031,113 | 7/1991 | Hollerbauer .................. 395/2.44 |
| 5,218,672 | 6/1993 | Morgan et al. ............... 395/162 |

FOREIGN PATENT DOCUMENTS

| 0245037 | 11/1987 | European Pat. Off. ......... H04H 1/00 |
| 2245745 | 8/1992 | United Kingdom ............ G11B 27/30 |
| 86055025 | 8/1986 | WIPO ............................. G10L 5/00 |

OTHER PUBLICATIONS

Inspec Abstract No. C9409-5585-007, Wilcox, L. et al., Proceedings of 1992 Conference on Human Factors in Computer Systems (1992).

*Primary Examiner*—Kee M. Tung
*Attorney, Agent, or Firm*—Ronald P. Kananen

[57] ABSTRACT

A method of labelling digital audio data corresponding to recorded audio ("takes"). According to this method speech recognition software is employed to generate text based on a portion of the recorded audio data. The generated text is then associated with the audio data file, thereby labelling the file based on its content. According to this technique, the need for monitoring and manual entry of text data in labelling takes is eliminated.

5 Claims, 2 Drawing Sheets

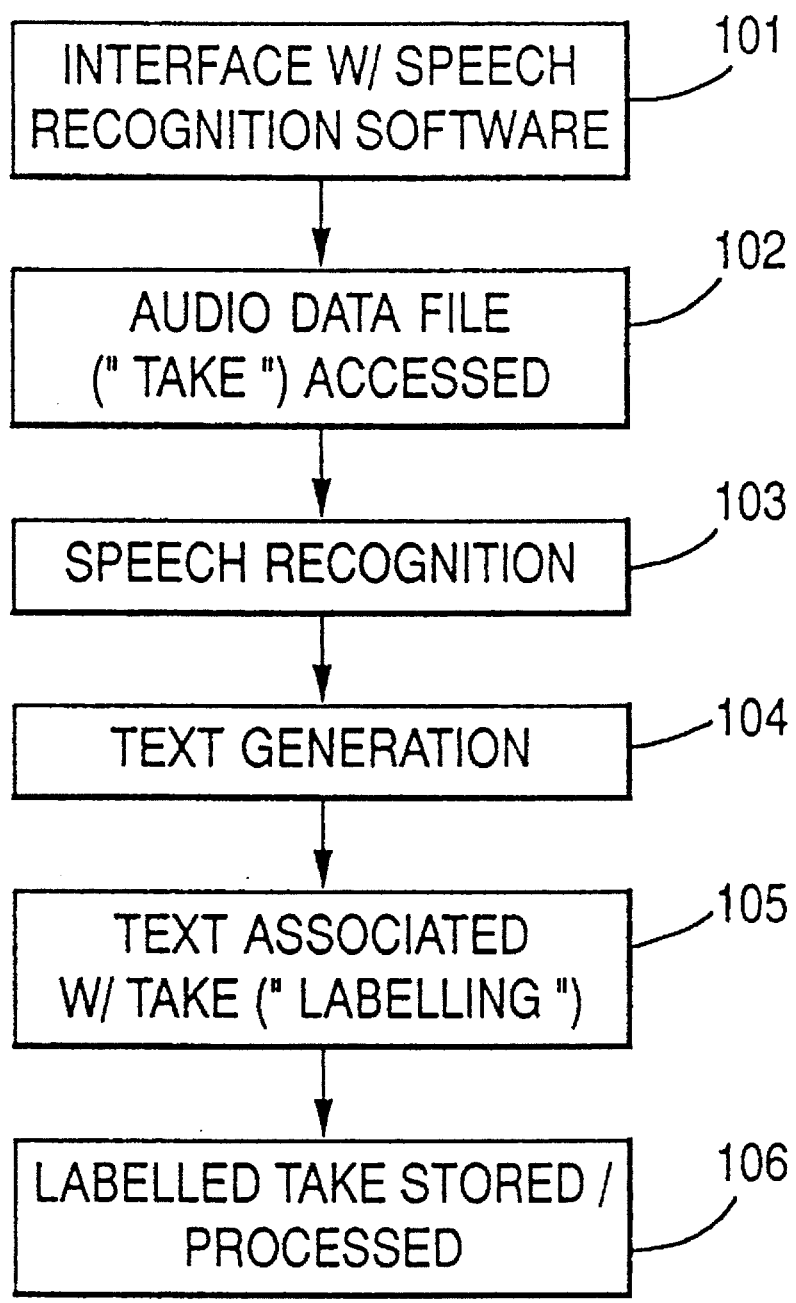

METHOD OF LABELLING TAKES IN AN AUDIO EDITING SYSTEM

FIELD OF THE INVENTION

This invention relates to audio recording. More particularly, it relates to a method of labelling takes with an audio editing system.

BACKGROUND OF THE INVENTION

Audio editing systems are used to perform a variety of functions in conjunction with recorded or live audio. According to one type of system, an editor workstation is employed to process digital data which corresponds to a recorded audio signal. The digital data may be stored in any conventional type of storage medium, such as a disk, or may be stored in memory associated with the workstation. The recorded audio data is commonly referred to as a "take."

Currently, when takes are input to a workstation, a label must be typed in by an operator in order to identify each take. When the take consists of recorded dialog, the label commonly consists of the first few words of recorded dialog. Takes consisting of music might be labelled "MUSIC1," "MUSIC2," and so forth. However, the labelling of takes based on the content of the take requires longer processing than assigning an arbitrary label. This is so because content based labelling consists of the inputting the take, listening to the inputted take to formulate a corresponding identifying label, typing the identifying label to be associated with the take, then recording the take with its associated label.

Particularly when this operation is performed repeatedly, it becomes tedious for the operator. This results in fatigue which increases the likelihood of errors in entering appropriate labels, which in turn creates the risk that a stored take will be difficult to retrieve in the future. More significantly, this operation is costly because a great deal of time must be spent repeatedly typing in labels.

Accordingly, there is a need for an improved method of labelling takes in an audio editing system which is more time efficient and accurate than the convention manual method.

SUMMARY OF THE INVENTION

It is an object of this invention to meet this need and others by providing a method of labelling takes with an audio editing system comprising the following: (a) providing a workstation having memory means and a processor unit associated therewith; (b) programming said workstation with operating system software; (c) accessing with said workstation a digital data file corresponding to a dialog take; (d) interfacing said system software with speech recognition software; (e) subsequent to said interfacing and said accessing, implementing said speech recognition software to translate at least a part of said file into signals representative of text; (f) subsequent to said implementing, associating said signals representative of text with said file; and (g) subsequent to said associating, storing said file and the associated signals representative of text on a storage medium.

According to one aspect of the invention, said workstation includes a central processing unit and a digital signal processor.

According to another aspect of the invention, said step of associating is accomplished by phonetically translating said portion of said file into signals representative of text.

BRIEF DESCRIPTION OF THE DRAWINGS

FIG. 3 is a flow-chart illustrating an embodiment of the invention.

DETAILED DESCRIPTION OF THE PREFERRED EMBODIMENTS

Figure 1:
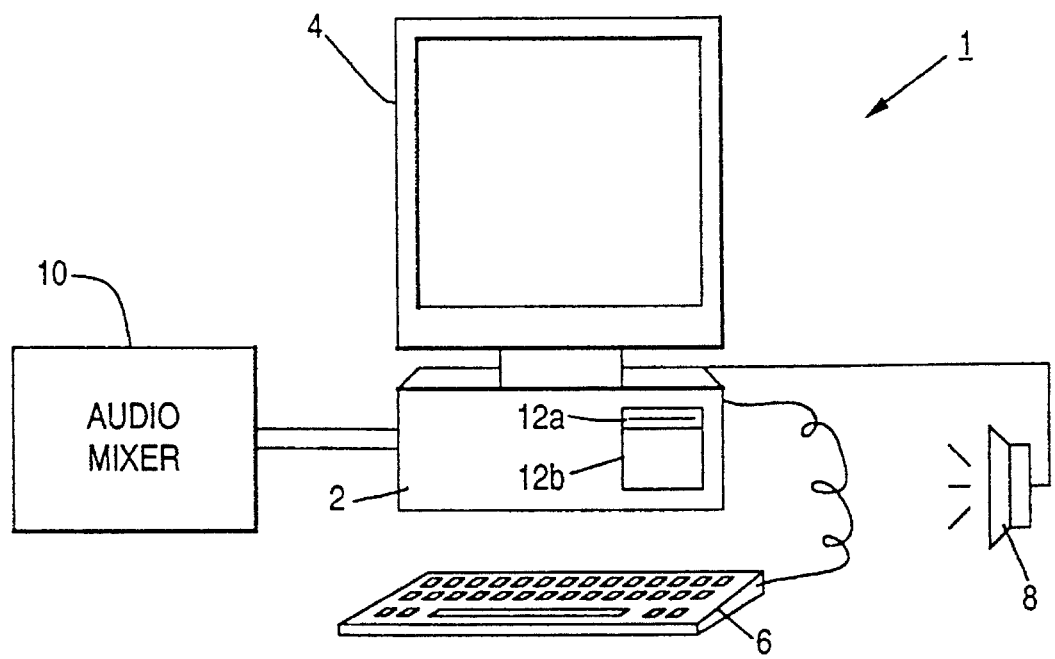
FIG. 1 is a representation of an audio editing system for implementing an embodiment of the invention.

FIG. 1 is a representation of an audio editing system which includes a typical digital audio workstation 1. The digital audio workstation 1 shown comprises, for example, a base unit 2, a monitor 4 and a keyboard 6. The workstation is coupled via an appropriate interface (not shown) to a monitor device, such as a speaker 8. The workstation may also additionally be coupled to an audio mixer console according to various techniques known in the art. For example, the workstation may be coupled to the mixer console 10 via a parallel or serial interface through which data may be transferred. Additionally, the workstation typically includes some type of conventional mass storage device, such as a fixed disk drive 12b or floppy disk drive 12a. The storage device is used to store digital data which represents recorded audio signals.

Such a configuration may be used to edit previously recorded audio data stored as digital data. According to the conventional technique, the workstation is appropriately configured with system software to process collections of digital audio data stored, for example, on disk or in memory. In a typical operation, a digital audio data file is accessed and translated into an analog signal which is output to the monitor device. For example, digital audio data might be downloaded from the mixer console to the workstation. The operator then listens to audio signals obtained from the digital audio data using the speaker. With the keyboard, the operator then inputs text which identifies the audio data being monitored. Typically this data is stored in ASCII format. The operating software associates the entered text data with the audio data file, and both sets of data are stored. In this way, each audio data file (each "take") has text data (a "label") stored therewith.

Figure 2:
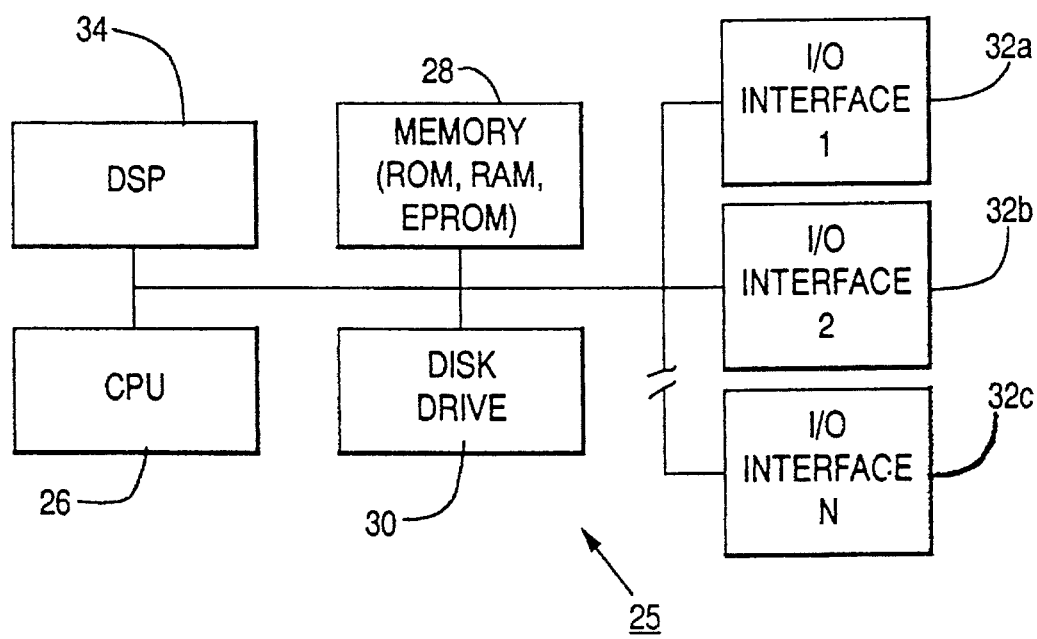
FIG. 2 is a more detailed representation of the typical components of a digital audio workstation for implementing an embodiment of the invention.

The digital audio workstations now in use possess relatively large processing capabilities. As illustrated in FIG. 2, a digital audio workstation 25 includes a central processing unit 26, various memory areas 28 (for example, ROM, RAM, EPROM), one or more disk drives 30, various input/output interfaces 32a, 32b, and 32c, and one or more digital signal processors (DSPs) 34. The large processing capability offered by such workstations enable convenient editing using conventional graphic display techniques and methods for audio monitoring of recorded takes.

According to the present invention, the processing capabilities now available are used to significantly decrease the amount of time necessary to label takes. One embodiment of the invention is described with reference to the flow chart shown as FIG. 3. Of course, variations of this embodiment and other embodiments will be apparent to those skilled in the art. For example, the order of performing the various steps described below may be altered without departing from the scope of the invention.

According to the present invention, speech recognition software is made available to the digital audio workstation by any of a number of techniques known in the art. For example, a commercially available program might be installed onto the local storage device, accessed through the system software, and stored in RAM from which it is available to the operator. For example, "Dragon Dictate," commercially available from Dragon Systems of Boston, Mass. has the capabilities required for use in conjunction with the invention. Of course, the invention is not limited to any specific method of accessing the speech recognition software, nor to any specific speech recognition program.

Once it is made available to the system, the speech recognition software is interfaced through system software which controls the operation of the digital audio workstation according to conventional techniques, as represented in the first step 101 of FIG. 3. As will be readily apparent to those skilled in the art, the precise steps necessary to achieve this interfacing will vary according to the capabilities of the workstation, and the features of both the speech recognition software and system software employed.

Once the digital audio workstation is properly interfaced with the speech recognition software, stored digital audio data files, that is, takes are then processed using the speech recognition software to obtain text data pursuant to illustrated step 102.

Once stored audio data are accessed in memory or from disk, the speech recognition software is utilized to generate a set of data corresponding to a portion of the take as represented in step 103. Preferably, this operation is accomplished by utilizing any DSP associated with the workstation. For example, the system might be programmed to process the first portion of detected audio monologue and obtaining therefrom text of a predetermined length, such as that corresponding to the first five words of the detected dialog. This step of text generation might be achieved by any conventional technique. For example, according to one common technique, digital audio data is separated into clusters of data which are then converted to text phonetically by use of a stored look-up table.

As shown in step 105, once the text is generated using the speech recognition software, the generated text is associated with the audio data file, that is, the take, from which the text was obtained. The labelled take is then stored, transferred or processed as desired as represented in step 106. For example, the text might be displayed to the operator as a means to verify proper operation of the process.

According to this technique, it is unnecessary to either monitor the stored audio and type in labels as previously required. Moreover, this method may be incorporated readily into a process wherein takes are recorded as digital audio data, downloaded to a video workstation, labelled automatically according to the content of the take and stored.

The foregoing is a detailed description of the preferred embodiment. The scope of the invention, however, is not so limited. Various alternatives will be readily apparent to one of ordinary skill in the art. The invention is only limited by the claims appended hereto.

What is claimed is:

1. A method of automatically labeling takes in an audio editing system comprising:

(a) providing a workstation having memory means and a processor unit associated therewith;

(b) programming said workstation with operating system software;

(c) accessing with said workstation a digital data file corresponding to a speech take;

(d) interfacing said system software with speech recognition software;

(e) subsequent to said interfacing and said accessing, implementing said speech recognition software to translate at least a portion of said digital data file corresponding to a speech take into a set of data that is representative of text;

(f) subsequent to said implementing, creating a file identifier which is derived from said set of data and associating said file identifier with said digital data file; and (g) subsequent to said creating and associating, storing said digital data file and the associated file identifier on a storage medium, thereby facilitating accessing of said digital data file.

2. The method of claim 1 wherein said workstation includes a central processing unit and a digital signal processor.

3. The method of claim 1 wherein said step of creating further comprises phonetically translating said portion of said digital data file into said set of data.

4. The method of claim 1 wherein said workstation is operatively coupled to an audio mixer console.

5. The method of claim 4 wherein said digital data file is downloaded to said workstation from said audio mixer console.

* * * * *